United States Patent
Ramshaw et al.

(10) Patent No.: US 7,115,235 B1
(45) Date of Patent: Oct. 3, 2006

(54) ROTATING SURFACE OF REVOLUTION REACTOR WITH TEMPERATURE CONTROL MECHANISMS

(75) Inventors: Colin Ramshaw, Ponteland (GB); Roshan Jeet Jee Jachuck, Abbey Farm (GB); Michael Jones, Royston (GB); Ian Henderson, Stokesley (GB)

(73) Assignee: Protensive Limited, Cambridge (GB)

( * ) Notice: Subject to any disclaimer, the term of this patent is extended or adjusted under 35 U.S.C. 154(b) by 0 days.

(21) Appl. No.: 09/913,905

(22) PCT Filed: Feb. 17, 2000

(86) PCT No.: PCT/GB00/00526

§ 371 (c)(1),
(2), (4) Date: Jan. 23, 2002

(87) PCT Pub. No.: WO00/48732

PCT Pub. Date: Aug. 24, 2000

(30) Foreign Application Priority Data

Feb. 17, 1999 (GB) .................................... 9903474

(51) Int. Cl.
*B01J 19/08* (2006.01)
(52) U.S. Cl. .................. 422/135; 422/138; 422/186; 422/186.3; 422/186.29; 422/224
(58) Field of Classification Search ............... 422/135, 422/138, 186, 186.3, 186.29, 224; 261/88, 261/89
See application file for complete search history.

(56) References Cited

U.S. PATENT DOCUMENTS

| 990,494 | A | | 4/1911 | Pfouts |
| 1,629,200 | A | | 5/1927 | Buhtz |
| 2,210,928 | A | | 8/1940 | Hickman |
| 3,730,486 | A | * | 5/1973 | Hayashi et al. ............. 366/149 |
| 3,831,907 | A | | 8/1974 | Claes |
| 3,902,857 | A | * | 9/1975 | Vander Mey et al. ....... 422/198 |
| 4,163,751 | A | * | 8/1979 | Van der Mey et al. ....... 558/33 |
| 4,311,570 | A | * | 1/1982 | Cowen et al. ......... 204/157.41 |

(Continued)

FOREIGN PATENT DOCUMENTS

EP        0 020 055    12/1980

(Continued)

OTHER PUBLICATIONS

R.J.J. Jachuck and C. Ramshaw, "Process Intensification: Spinning Disc Polymeriser", "The 1995 Icheme Research Event/First European Conference", printed Jun. 13, 2003, pp. 556-558.

(Continued)

*Primary Examiner*—N. Bhat
(74) *Attorney, Agent, or Firm*—Garvey, Smith, Nehrbass & North, L.L.C.; Seth M. Nehrbass; Brett A. North

(57) ABSTRACT

A reactor including a rotatable disc (3) having first (5, 19) and second (20, 30) surfaces. Reactant (15) is supplied to the first surface (5, 19) by way of a feed (4), the disc (3) is rotated at high speed, and the reactant (15) forms a film (17) on the surface (5, 19). As the reactant (15) traverses the surface (5, 19) of the disc (3), it undergoes chemical or physical processes before being thrown from the periphery of the disc (3) into collector means (7). Means for supplying a heat transfer fluid (35) to the second surface (20, 30) are also provided so as to allow the first surface (5, 19) and hence the reactant (15) to be cooled or heated.

12 Claims, 4 Drawing Sheets

U.S. PATENT DOCUMENTS

| | | |
|---|---|---|
| 4,343,750 A | 8/1982 | Holiday et al. |
| 4,356,133 A * | 10/1982 | Cowen et al. ............... 264/8 |
| 4,460,278 A * | 7/1984 | Matsubara et al. ........ 366/149 |
| 4,511,414 A | 4/1985 | Matsui et al. |
| 4,549,998 A * | 10/1985 | Porter et al. ............... 261/88 |
| 4,622,687 A * | 11/1986 | Whitaker et al. ........... 378/130 |
| 4,627,803 A | 12/1986 | Umetsu |
| 4,945,562 A | 7/1990 | Staub |
| 5,624,999 A | 4/1997 | Lombardi et al. |
| 6,482,960 B1 * | 11/2002 | Brechtelsbauer et al. ... 549/332 |
| 6,515,153 B1 * | 2/2003 | Burns et al. ............... 554/69 |
| 2003/0139543 A1 * | 7/2003 | Wilhelm et al. ............. 526/65 |
| 2003/0161767 A1 * | 8/2003 | Ramshaw et al. ..... 422/186.29 |

FOREIGN PATENT DOCUMENTS

| | | |
|---|---|---|
| EP | 0 499 361 A1 | 8/1992 |
| EP | 0 810 633 A2 | 12/1997 |
| GB | 328410 | 5/1930 |
| GB | 1080863 | 8/1967 |
| GB | 1600708 | 10/1981 |
| GB | 2108407 | 5/1983 |
| GB | 2241774 A | 9/1991 |
| JP | 10270319 | 10/1998 |
| WO | WO 96/00189 | 1/1996 |

OTHER PUBLICATIONS

Suslick, Kenneth S., "The Chemical Effects of Ultrasound", Scientific American, Feb. 1989, pp. 80-86.

* cited by examiner

ROTATING SURFACE OF REVOLUTION REACTOR WITH TEMPERATURE CONTROL MECHANISMS

The present invention relates to a rotating surface of revolution reactor provided with various temperature control mechanisms.

The invention makes use of rotating surfaces of revolution technology (hereinafter RSORT) (commonly known as spinning disc technology).

The spinning disc concept is an attempt to apply process intensification methods within the fields of heat and mass transfer. The technology operates by the use of high gravity fields created by rotation of a disc surface causing fluid introduced to the dire surface at its axis to flow radially outward under the influence of centrifugal acceleration in the form of thin often wavy films. Such thin films have been shown to significantly improve the heat and mass transfer rates and mixing. The technology was developed for typical heat and mass transfer operations such as heat exchanging, heating, cooling and mixing, blending and the like, for example as disclosed in R J J Jachuck and C Ramshaw, "Process Intensification: Heat transfer characteristics of tailored rotating surfaces", Heat Recovery Systems & CHP, Vol. 14, No 5, p 475–491, 1994.

More recently the technology has been adapted for use as a reacting surface for systems which are heat and mass transfer limited, for example for the reaction of substrates which are highly viscous during at least a stage of the reaction and cause problems in achieving good mixing and product yields.

Boodhoo, Jackuck & Ramshaw disclose in "Process Intensification: Spinning Disc Polymeriser for the Manufacture of Polystyrene" the use of a spinning disc apparatus in which monomer and initiator is reacted by conventional means to provide a prepolymer which is then passed across the surface of a spinning disc at elevated temperature providing a conversion product in the form of polymerised styrene.

EP 0 499 363 (Tioxide Group Services Limited) discloses another use for spinning disc technology in photo catalytic degradation of organic materials such a hydrocarbons. A solution of salicylic acid and titanium dioxide catalyst was passed across the surface of a rotating disc and irradiated with ultra violet light.

These publications therefore disclose the use of spinning disc technology for heating and mass transfer in inert and reactive systems.

GB 9903474.6 (University of Newcastle), from which the present application claims priority and the disclosure of which is hereby incorporated into the present application by reference, describes the use of RSORT in the conversion of a fluid phase substrate by dynamic heterogeneous contact with an agent. In this application, it is described how it has surprisingly been found that spinning disc technology may be further adapted to apply process intensification methods not only within the fields of heat and mass transfer but also within the field of heterogeneous contacting. Furthermore, it is described how it has surprisingly been found that the quality of the product obtained is of higher quality than that obtained by conventional processing having, for example, a higher purity or, in polymers, a narrower molecular distribution.

In addition to this, spinning disc technology can be used to obtain products not readily obtainable by other technology.

According to a first aspect of the present invention, there is provided a reactor apparatus including a hollow support element adapted to be rotatable about an axis, the support element having a first, external reaction surface and a second, internal heat transfer surface and means for applying a heat transfer fluid to the second surface, the first and second surfaces being in thermal communication with each other and the support element including an internal space bounded on one side by the second surface, characterised in that a plate or membrane is provided inside the hollow support element, the plate or membrane extending substantially over the whole internal space so as to define a first space between the second surface and one side of the plate or membrane and a second space between an opposed side of the plate or membrane and an internal surface of the support element remote from the second surface, but leaving a gap at a periphery of the plate or membrane so as to allow a heat transfer fluid to flow between the first and second spaces.

According to a second aspect of the present invention, there is provided a reactor apparatus including a support element adapted to be rotatable about an axis, the support element having generally opposed first and second surfaces, feed means for supplying at least one reactant to the first surface of the support element, collector means for collecting product from the first surface of the support element and means for applying a heat transfer fluid to the second surface, characterised in that the support element has a generally circular outer perimeter provided with a groove or indent thereabout and a circumferential baffle is fitted about the perimeter of the support element so as to project into the groove or indent while still allowing the support element to rotate freely, the circumferential baffle serving to keep separate reactant and heat transfer fluid which are thrown respectively from the first and second surfaces during operation of the reactor.

According to a third aspect of the present invention, there is provided a reactor apparatus including a support element adapted to be rotatable about an axis, the support element having generally opposed first and second surfaces, feed means for supplying at least one reactant to the first surface of the support element, collector means for collecting product from the first surface of the support element and means for applying a heat transfer fluid to the second surface, characterised in that the second surface includes an axially located undercut trough into which the heat transfer fluid is supplied during operation of the reactor.

It is to be understood that the term "reactant" is not limited to substances which are intended to undergo chemical reaction on the first surface of the support element, but also includes substances which are intended to undergo physical or other processes such as mixing or heating. Similarly, the term "product" is intended to denote the substance or substances which are collected from the first surface of the support element, whether these have undergone chemical or physical processing or both. In addition, although it is envisaged that most reactants and products will be in the liquid phase, the apparatus can be used with any suitable fluid phase reactants and products, including combinations of liquid, solid and gaseous reactants and products. For example, solid phase substances in substantially free-flowing particulate form can have macroscopic fluid flow properties.

An RSORT apparatus (commonly known as a spinning disc reactor) generally includes within a conversion chamber a rotating surface or an assembly of a plurality of these which is rotated about an axis to effect transfer of one or more reactants from the axis preferably radially across the rotating surface.

An RSORT apparatus as hereinbefore defined comprising a rotating surface as hereinbefore defined has a number of advantageous constructional features according to the present invention.

The heat transfer fluid may be gaseous or liquid, or possibly a solid in particulate form having macroscopic fluid flow properties. In typical applications, water or steam is used as the heat transfer fluid, but other fluids having different freezing and boiling points and different specific heat capacities may be used depending on requirements.

The means for applying the heat transfer fluid to the second surface may take a number of forms. In one embodiment, the support element is generally hollow, with the first surface being an external surface and the second surface being an internal surface in thermal communication with the first surface. For example, where the support element is generally planar and horizontally mounted on a drive shaft for rotation, the first surface may be an upper external surface of the body of the support element and the second surface will be the corresponding inner surface of that part of the support element. A heat transfer fluid may then be supplied to the interior of the support element, possibly by way of a hollow stem drive shaft, so as to contact the second surface and to transfer heat thereto or therefrom. Because the second surface is in thermal communication with the first surface, this serves to effect heat transfer to and from the first surface. Advantageously, a flow path is defined within the support element so as to provide a pathway for heat transfer fluid to circulate into and out of the support element before and after contacting the second surface. This can be achieved by providing a plate or membrane within the hollow support element which extends over substantially the whole space within the support element but leaving a gap at peripheral regions thereof, and serving to define a first space between the second surface and one side of the plate or membrane and a second space between the other side of the plate or membrane and a portion of the support element remote from the second surface. Heat transfer fluid may then be circulated, for example through a hollow stem drive shaft, to a central region of the first space. The heat transfer fluid is then caused to flow through the first space across the second surface, transferring heat thereto or therefrom, before flowing back to the hollow stem drive shaft via the peripheral gap and through the second space on the side of the plate or membrane remote from the second surface.

Advantageously, the second surface includes means for extending its effective surface area for heat transfer purposes. For example, thermally conductive vanes, fins or other projections may be provided on the second surface. Alternatively, a thermally conductive mesh or gauze or foam may be provided in the first space and in thermal contact with the second surface. The side of the plate or membrane which faces the second space may advantageously be provided with vanes, fins or other projections or with a mesh or gauze or foam so as to help prevent the formation of free vortices in the heat transfer fluid which could otherwise generate a high pressure drop between input and output of the fluid. Where vanes or fins are provided, these are preferably radially oriented with respect to the axis of rotation.

Instead of a hollow support element, a solid support element may be used. In this embodiment, the second surface is an exterior surface of the support element opposed to the first surface and in thermal communication therewith. Heat transfer fluid may then be supplied to the second surface either by spraying the fluid onto the second surface or by feeding the fluid to a central portion of the second surface from where it is spread over the second surface by rotation of the support element. The heat transfer fluid will tend to migrate across the second surface from the central portion to a periphery thereof in the form of a film before being thrown from the periphery of the second surface. Collector means such as a bowl or trough located about the support element may be provided so as to collect and recycle the heat transfer fluid. The second surface may be provided with a mesh, grid, corrugations or other projections which serve to increase the heat transfer area of the second surface and also to increase the residence time of the heat transfer fluid on the second surface. The mesh, grid, corrugations or other projections are preferably good thermal conductors and are in thermal communication with the second surface and hence the body of the support element and the first surface. The collector means is advantageously adapted to allow independent collection of heat transfer fluid from the second surface and product from the first surface. For example, where the support element is generally disc shaped, with the first surface uppermost and the second surface facing down, a groove or indent may be provided about the circumference of the support element between the first and second surfaces. A circumferential baffle or plate is then fitted about the support member so as to project into the groove or indent around the whole circumference of the support member while still allowing the support member to rotate freely. The baffle or plate thereby allows product thrown from the first surface to be collected independently of heat transfer fluid thrown from the second surface.

The axis of rotation of the rotating surface or support member may be substantially vertical, in which case gravity tends to pull reactants downwardly with respect to the surface or support member. This may be advantageous with less viscous reactants. Alternatively, the axis of rotation may be generally horizontal, which can achieve improved mixing of reactants provided that these are appropriately retained on the first surface of the support member.

Any suitable feed means may be provided to feed the at least one reactant and the heat transfer fluid onto the rotating first and second surfaces. For example, the feed means may comprise a feed distributor in the form of a "shower head", a "necklace" of outlets or a simple, preferably adjustable, single point introduction such as a "hose-pipe type" feed means. Preferably, the feed means comprises a feed distributor having a plurality of uniformly spaced outlets for the at least one reactant on to the rotating surface as hereinbefore defined. The feed means may also include means for applying UV, IR, X-ray, RF, microwave or other types of electromagnetic radiation or energy, including magnetic and electric fields, to the reactants as they are fed to the trough, or may include means for applying vibration, such as ultrasonic vibration, or heat.

The feed means may be provided at any suitable position with respect to the rotating surface which allows feed of the reactant or the heat transfer fluid. For example, the feed means may be axially aligned with the rotating surface for axial feed. Alternatively, the feed means may be positioned such that the feed is spaced from the axis of the rotating surface. Such a position may lead to more turbulence and an enhanced mixing effect.

Advantageously, the first and/or the second surface includes a trough into which the at least one reactant and/or the heat transfer fluid is supplied by the feed means.

The depth of the trough in the first surface may be selected in accordance with reaction requirements. For example, for photochemical reactions in which UV light is shone onto the reactant, it is preferred for the trough to be relatively shallow, for example having a depth of the same order of magnitude or within one order of magnitude as the expected thickness of a film of reactant formed across the first surface of the support element when rotating at an appropriate speed.

In one embodiment, feed means may comprise a single feed to each trough which is preferably situated on or co-axial with the axis of rotation of the rotating surface. In this embodiment, reactant or heat transfer fluid flows from the feed outlet into the trough and is subsequently spread out of the trough on to the rotating surface by centrifugal force. In a preferred embodiment, the rotating element as hereinbefore defined comprises a trough situated on the axis of rotation.

The trough as hereinbefore defined may be of any suitable shape such as continuous or annular. For example it may have a continuous concave surface comprising part of a sphere, such as a hemispherical surface, or it may have an inner surface joined to the rotating surface by at least one connection wall or at least two, in the case where the trough is annular. The inner surface and connection wall may be of any form which allows the function of a trough to be fulfilled. For example the inner surface may be parallel to the rotating surface or concave or convex. The connection wall may comprise a single circular or ovoid wall or a plurality of straight walls. The walls may diverge or converge towards the rotating surface.

Preferably, a single circular wall is provided which converges towards the rotating surface to form an undercut trough. This shape generates a reservoir which enhances a circumferential distribution of the reactant or heat transfer fluid flow. Alternative means for forming an undercut trough are also envisaged. For example, where the trough is generally annular in shape, an outer wall may be provided as above, and an inner wall having any suitable shape may serve to define an inner edge to the trough. The undercut portion of the trough should generally be provided as an outer wall so as to help prevent uncontrolled egress of reactant or heat transfer fluid from the trough to the first or second surface under the influence of centrifugal force as the support element is rotated.

Advantageously, a matrix may be provided in the trough so as to help reactant or heat transfer fluid present in the trough to rotate with the support element, thereby helping to achieve substantially uniform flow from the trough across the first or second surface. The matrix may be in the form of a plug of fibrous mesh, such as metal or plastics wool, or may take the form of a plurality of projections which are secured to an inner surface of the trough. Other matrix means will be apparent to the skilled reader. In some embodiments, the matrix is manufactured of a material which is inert with respect to the at least one reactant or the product and which is not significantly affected by temperature and other variable process conditions. Alternatively, the matrix may be made of a material which does interact with the at least one reactant or the product, such as a heterogeneous catalyst (e.g., nickel, palladium or platinum or any suitable metal or alloy or compound thereof). Where the matrix is made out of an electrically conductive material, it may be possible to supply an electric current therethrough and thus to provide heating means for heating the at least one reactant within the trough.

In a further embodiment, there may be provided a plurality of feeds adapted selectively to supply one or more reactants to a plurality of troughs formed in the first surface. For example, where the support element is generally disc-like and has a substantially central axis of rotation, there may be provided a first central trough centred on the axis of rotation and feed means for supplying at least one reactant to the first trough, and at least one further trough, preferably also centred on the axis of rotation and having an annular configuration, the at least one further trough being provided with feed means for supplying a second reactant, which may be the same as or different from the first reactant, to the at least one further trough. It will be apparent to the skilled reader that a plurality of troughs may be provided in a similar manner on support elements with shapes other than generally disc-like.

By providing a plurality of troughs and feeds, a sequence of reactions can be performed across the first surface of the support element. For example, two reactants may be supplied to the first trough in which some mixing and reaction will take place. As the support element rotates, the reactants will spread from the first trough to the first surface of the support element, where further reaction and mixing takes place, and thence into a second annular trough concentric with the first trough. A third reactant may then be supplied to the second trough, and further mixing and reaction will take place as the third reactant and the two initial reactants and any associated product are spread from the second trough onto the first surface of the support element for further mixing and reaction. Because the direction of travel of the reactants and products is outwards from the axis of rotation, a controlled series of reactions can be carried out across the first surface of the support member.

Any suitable collection means may be provided for collection of the product as it leaves the rotating surface at its periphery. For example, there may be provided a receptacle in the form of a bowl or trough at least partially surrounding the rotating element or other fixed part of the apparatus. The collection means may additionally comprise a deflector positioned around the periphery of the rotating surface to deflect product into the collection means. The deflector is preferably positioned at an acute angle to the rotating surface.

The components of the collection means, such as the bowl or trough or deflector, may be coated or otherwise provided with a heterogeneous catalyst appropriate to the reactants being reacted on the support element, or may even consist entirely of a material which acts as a heterogeneous catalyst. Furthermore, the components of the collection means may be heated or cooled to a predetermined temperature so as to enable control over reaction parameters, for example by serving to halt the reaction between reactants as these leave the first surface in the form of product. Feed means for supplying a reactant to the product leaving the first surface may also be provided. For example, there may be provided feed means for feeding a quenching medium to product in the collection means so as to halt chemical or other reactions between reactants when these have left the first surface.

The collection means may further comprise outlet means of any suitable form. For example, there may be a single collection trough running around the periphery of the disc or a collection bowl partially surrounding the rotating element.

Outlet means may also be provided in the collection means and these may take the form of apertures of any size and form situated at any suitable position of the collection means to allow egress of the product. In one preferred embodiment, the outlet means are situated to allow vertical egress of the substrate in use.

Alternatively, the collection means may comprise an outer wall provided at the periphery of the support element so as to prevent product from being thrown from the first surface, and at least one pitot tube which extends into the product which is restrained at the periphery of the support element by the outer wall. The outer wall may converge generally towards the axis of rotation of the support member so as better to retain product while the support element is undergoing rotation, although other wall configurations, such as generally parallel to or divergent from the axis of rotation may also be useful.

Embodiments of the present invention may include multiple support elements, which may share a common axis of rotation and which may be mounted on a single rotatable shaft, or which may be provided with individual rotatable shafts. The collection means associated with any given support element may be connected to the feed means associated with any other given support element so as to link a number of support elements in series or parallel. In this way, a reaction may be conducted across a number of support elements in series or parallel. The collection means of a first support member may be directly connected to the feed means of a second support member, or may be connected by way of a processing unit such as a pump, extruder, heater or heat exchanger or any other appropriate device. This is especially useful when dealing with viscous products, such as those which are obtained in polymerisation reactions, since the viscous product of a first support element may be processed so as to acquire more favourable physical characteristics before being used as the reactant feed for a second support element.

For example, where the collection means comprises an outer wall on the first surface of the support element as described above, a number of support elements may be coaxially mounted on a single rotatable shaft so as to form a stack of support elements. A reactant feed is led to the trough of a first support element, and a collector in the form of a pitot tube has its tip located near the first surface of the first support element in the vicinity of the wall so as to take up product from this region. An end of the pitot tube remote from the tip is led to the trough of a second support element so as to allow the product of the first support element to serve as the reactant for the second support element, thereby allowing a number of reactions to take place in series. Alternatively, a number of parallel feeds may supply the same at least one reactant simultaneously to the troughs of a number of support elements and a number of parallel pitot tube collectors may gather product from a peripheral region of each support element, thereby allowing a reaction to take place across a number of support elements in parallel.

It is also envisaged that product collected from the periphery of a support element may be recycled as feed for that support element. This is useful for processes requiring an extended contact time for the reactants. The product may be fully or only partially recycled, depending on requirements.

Reference herein to a rotating surface is to any continuous or discrete planar or three dimensional surface or assembly which rotates approximately or truly about an axis, and preferably is reference to an approximate or true rotating surface of revolution. An approximate rotating surface of revolution may comprise an asymmetric axis and/or deviation in the surface body and/or circumference creating an axially or radially undulating surface of revolution. A discrete surface may be in the form of a mesh, grid, corrugated surface and the like.

Reference herein to a substantially radially outward flowing film as hereinbefore defined is to any fluid film which may be created by dynamic contact of the fluid phase reactant and the rotating surface as hereinbefore defined, suitably the fluid phase reactant is contacted with the rotating surface at any one or more surface locations and caused to flow outwardly by the action of centrifugal force. A film may be a continuous annulus or may be a non-continuous arc at any radial location. The substrate may provide a plurality of films in dynamic contact with a rotating surface as hereinbefore defined.

For example processes requiring extended contact time may be carried out in continuous manner with use of a recycle of fluid exiting at the periphery of the rotating surface towards the axis of the rotating surface enabling sequential passes of fluid across the surface. In continuous steady state operation an amount of fluid exiting the surface may be drawn off as product and an amount may be returned by recycle for further conversion with an amount of fresh reactant feed.

The process of the invention as hereinbefore defined may operated in a single or plural stages. A plural stage process may comprise a first pre-process stage with further post-process or upgrading stages, and may be carried out batchwise with use of a single rotating surface as hereinbefore defined or may be carried out in continuous manner with multiple rotating surfaces in series.

Second or more reactants may be added to the feed reactant as it passes from one rotating assembly to the next or be added directly to the rotating assembly anywhere between the axis of rotation or the exit from the assembly. In certain cases a multi-step process may be achieved by reactant addition or additions between the axis of rotation and the exit of a single rotating assembly to achieve more than one process step in a single pass. It is also possible to have different regions of the rotating surface at different temperatures and conditions and have different surface geometries as appropriate to the process needs.

It will be apparent that the process of the invention may be controlled both by selection of a specific rotating surface for the support element and by selecting process variables such as temperature, speed of rotation, rate of reactant feed, conversion time and the like. Accordingly the process of the invention provides enhanced flexibility in process control including both conventional control by means of operating conditions, and additionally control by means of rotating surface type.

The apparatus may further comprise any suitable control system. Such a control system may regulate the temperature or contact time of reactants by means of speed of rotation, rate of substrate feed and other process parameters to obtain an optimum result.

The apparatus as hereinbefore defined may comprise means for optimising process conditions. For example, means for imparting an additional movement to the rotating surface, and thus to the reactant, may be provided. Such movement could be in any desired plane or plurality of planes and preferably comprises vibration. Any suitable vibration means may be provided, such as flexible mounting of the surface or off centre mounting, both inducing passive vibration or active vibration means, such as a mechanical element in contact with the rotating element and vibrating in a direction parallel to the rotating element axis. Preferably a passive vibration means is provided in the form of off centre mounting of the rotating element on its axis of rotation. Vibration may alternatively be provided by an ultrasonic emitter in contact with the rotating element for vibration in any desired plane or plurality of planes.

The rotating surface may have any shape and surface formation to optimize process conditions. For example the rotating surface may be generally planar or curved, frilled, corrugated or bent. The rotating surface may form a cone or be of generally frustoconical shape.

In one preferred embodiment the rotating surface is generally planar and preferably generally circular. The periphery of the rotating surface may form an oval, rectangle or other shape.

In another preferred embodiment the rotating surface is provided as the inner surface of a cone. The apparatus may comprise at least one cone and at least one other rotating surface or at least one pair of facing cones positioned so as to allow a two stage process with one or more reactants fed to each cone. Preferably product exits a smaller cone (or other surface of rotation) in a spray on to the surface of a larger cone (or other surface of rotation) by which it is at least partially surrounded and for the surface of which a further reactant is fed by feed means as hereinbefore defined, to allow mix of the product and reactant on the larger rotating surface. Preferably, means are provided such that the two cones counter rotate. Such an arrangement enhances mixing and intimate contact of the reactants and reduces the required physical contact time. Alternatively, means are provided such that the cones co-rotate or one is stationary.

A rotating surface of any shape and surface formation as hereinbefore defined may be provided with surface features which serve to promote the desired process. For example, the surface may be micro or macro profiled, micro or macro porous, non stick, for example may have a release coating, may be continuous or discontinuous and may comprise elements such as mesh, for example woven mesh, reticulate foam, pellets, cloth, pins or wires, for enhanced surface area, enhanced or reduced friction effect, enhanced or reduced laminar flow, shear mixing of recirculation flow in axial direction and the like.

In one preferred embodiment, mixing characteristics of the rotating surface are enhanced by the above features or the like provided on or in the rotating surface. These may be provided in any suitable regular or random arrangement of grids, concentric rings, spider web or like patterns which may be suitable for a given application.

Alternatively or additionally to any other surface feature, radially spaced pins in the form of circles or segments of circles may be provided.

In another preferred embodiment, a porous surface coating is provided, which aids processing of certain reactants. Such a coating may be provided in combination with any other of the aforementioned surface features.

Surface features in the form of groves may be concentric or may be of any desired radially spaced forms. For example, the grooves may form "wavy" or distorted circles for maximised mixing.

Grooves may be parallel sided, or may have one or both sides which diverge to form undercut grooves or which converge to form tapered grooves. Preferably, the grooves are undercut to promote mixing.

Grooves may be angled to project towards or away from the axis of the rotating surface to enhance or reduce undercut or taper.

Energy transfer means may be provided for the rotating surface or reactant or product as hereinbefore described. For example heating means may be provided to heat the reactant, for example, as part of the feed means. Additionally, or alternatively heating means may be provided to heat the rotating element in the form of radiant or other heaters positioned on the face of the rotating element which does not comprise the rotating surface for conversion. Preferably, radially spaced, generally circular radiant heaters are provided.

Any preferred cooling or quenching means may be provided in a suitable position to cool the reacted substrate. For example cooling coils or a heat sink may provide cooling by heat exchange, or a reservoir of quench may provide cooling or reaction termination by intimate mixing in the collection means.

In some embodiments, one of the reactants may be a liquid phase component and another may be a gaseous phase component. In these embodiments, the rotating support member is advantageously contained within a vessel so as to allow the concentration of the gaseous phase component in the vicinity of the surface to be controlled. The liquid component may be fed to the surface of the disc as described above, and the gaseous component supplied to the vessel. A rotary impeller or fan or similar device may be mounted close to the rotating surface and driven so as to suck the gaseous phase component from a region surrounding the periphery of the rotating surface towards the centre of the rotating surface while the liquid phase component travels from the centre of the surface towards its periphery due to the rotation of the rotating surface. Where, for example, the support element is a disc, the impeller or fan may take the form of a generally disc shaped structure mounted coaxially with the support element and close thereto. A surface of the impeller or fan facing the rotating surface of the support element may be provided with blades or vanes such that rotation of the impeller or fan serves to suck the gaseous phase component from a periphery of the surface and the impeller or fan towards the centre of the surface. By providing a counter-current flow of the gaseous and liquid phase components, heat or mass transfer between the components is much improved, since the concentration of unreacted liquid phase reactant is lowest at the periphery of the disc, and therefore benefits from a high concentration of the gaseous phase component so as to ensure full reaction.

In all the embodiments described above, it may be advantageous to arrange for the heat transfer fluid to change phase during its application to the second surface. This may be achieved by supplying the heat transfer fluid in a given phase, and maintaining a vapour pressure in the region of the second surface so as to promote phase change and to make use of the additional heat transfer available upon any change of phase (i.e. latent heats of phase change). For example, where a liquid heat transfer fluid is supplied at low vapour pressure, it will tend to evaporate in the region of the second surface, thus absorbing additional heat therefrom due to its latent heat of vaporisation.

For a better understanding of the present invention and to show how it may be carried into effect, reference shall now be made by way of example to the accompanying drawings, in which:

BRIEF DESCRIPTION OF THE DRAWINGS

FIG. 1 illustrates a spinning disc apparatus of the present invention. The apparatus is enclosed in vessel (1) having at its axis a drive shaft (2) supporting a spinning disc (3). Feed means (4) provides reactant to the surface (5) of the disc (3) about its axis (6). Rotation of the disc (3) causes reactant to flow radially outwards, whereby it contacts the surface (5) of the spinning disc (3). Fluid is collected at the peripheral edges of the disc (3) by means of collection trough (7) and may be rapidly quenched by means of cooling coils (8). A skirt (9) prevents meniscal draw back of fluid contaminating the drive shaft mechanism. Inlet means (10) enable controlled environment conditions to the provided, for example a nitrogen atmosphere. Outlet vent means (11) enable the venting of atmospheric gases or gases evolved during operation. Observation means are provided by means of windows (12) to observe the progress of the conversion.

Figure 1:
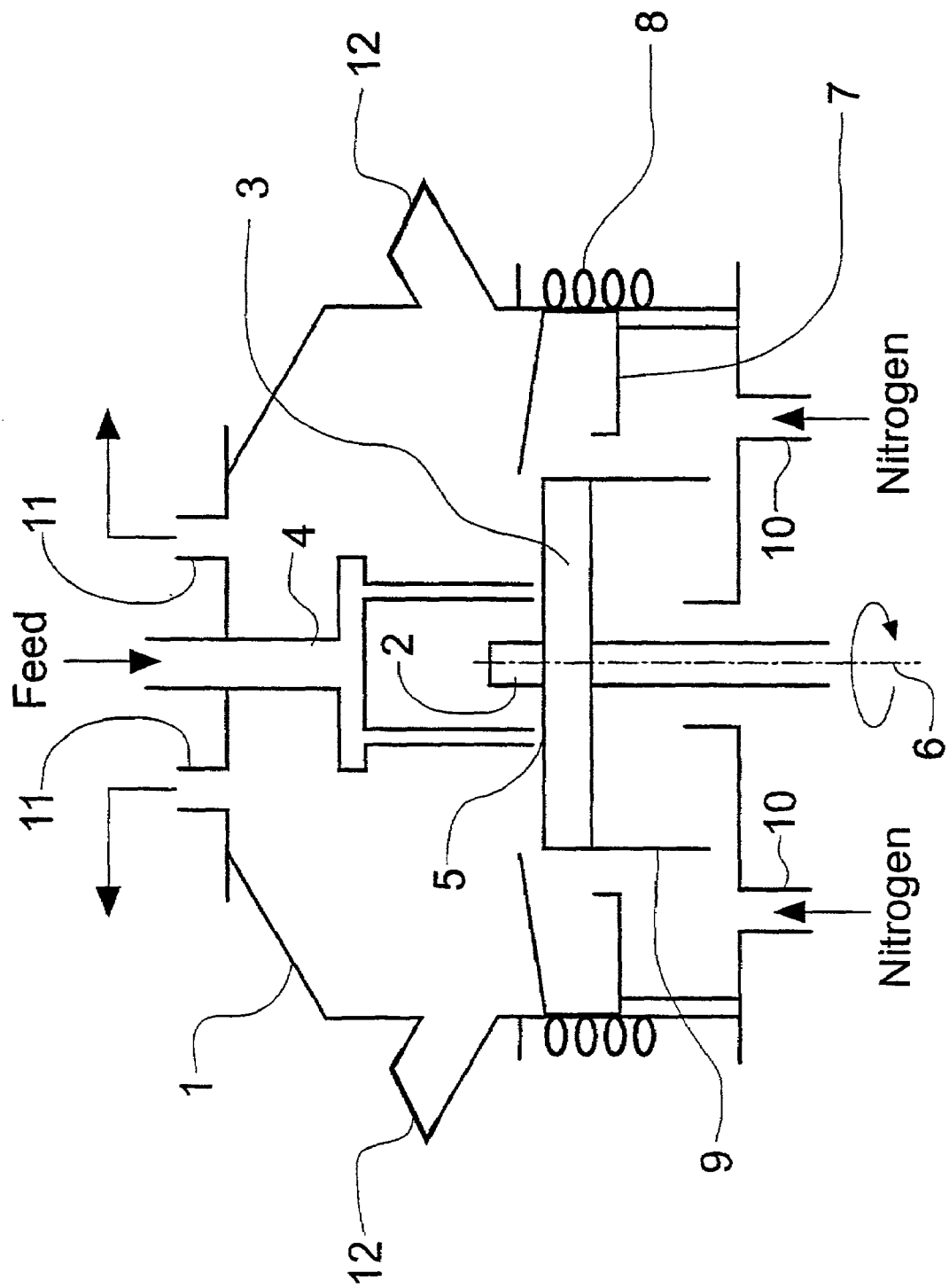
FIG. 1 shows a spinning disc apparatus in schematic form.

The apparatus of FIG. 1 may be started up and operated as described in Example 1 below. In the case that the process is an exothermic conversion, cooling coils (8) may be used to quench the collected product in the trough (7). The spinning disc (3) is provided with heating coils (not shown) which may be used to initiate or maintain conversion. The disc (3) or the reactor vessel (1) may be provided with a source of radiation, means for applying an electric or magnetic field and the like as described, at or above the disc surface (5) or at the wall of the reactor vessel (1).

Figure 2:
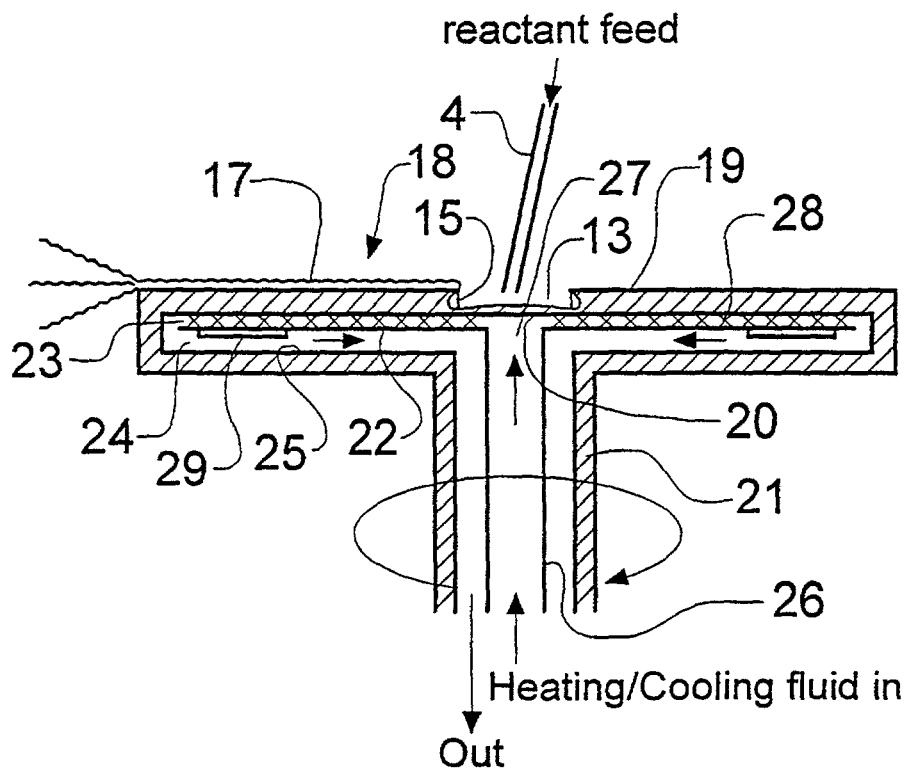
FIG. 2 shows a hollow spinning disc with an internal heat transfer fluid flow path.

FIG. 2 shows a hollow rotatable disc (18) having a first, exterior surface (19) and a second, interior surface (20) in thermal communication with the first surface (19). The disc (18) is mounted on a hollow stem drive shaft (21) which serves to rotate the disc (18). Reactant (15) is supplied to a trough (13) in a central portion of the first surface (19) by way of feed means (4), and upon rotation of the disc (18) spills onto the first surface (19) in the form of a film (17). A plate (22) is provided in the hollow interior of the disc (18) so as to divide the interior into a first space (23) between the plate (22) and the second surface (20) and a second space (24) between the plate (22) and a lower interior surface (25) of the disc (18). A heat transfer fluid feed pipe (26) is provided in the hollow stem drive shaft (21) and extends to a central aperture (27) in the plate (22), thereby allowing heat transfer fluid to be input into the first space (23). A peripheral gap is provided between the circumference of the plate (22) and the inner circumferential surface of the disc (18) so as to define a flow path from the first space (23) to the second space (24) and thence back to a region in the hollow stem drive shaft (21) outside the heat transfer fluid feed pipe (26). By passing heat transfer fluid about the flow path thus defined, it is possible to regulate the temperature of the first surface (19) upon which processing of reactant (15) is taking place. A thermally conductive mesh (28) is attached to the second surface (20) and extends into the first space (23) so as to enhance the heat transfer area of the second surface (20). Radial vanes (29) are provided on the plate (22) so as to extend into the second space (24), thereby helping to destroy free vortices which might otherwise be generated in the heat transfer fluid, leading to a high pressure drop between the heat transfer fluid input and output.

Figure 3:
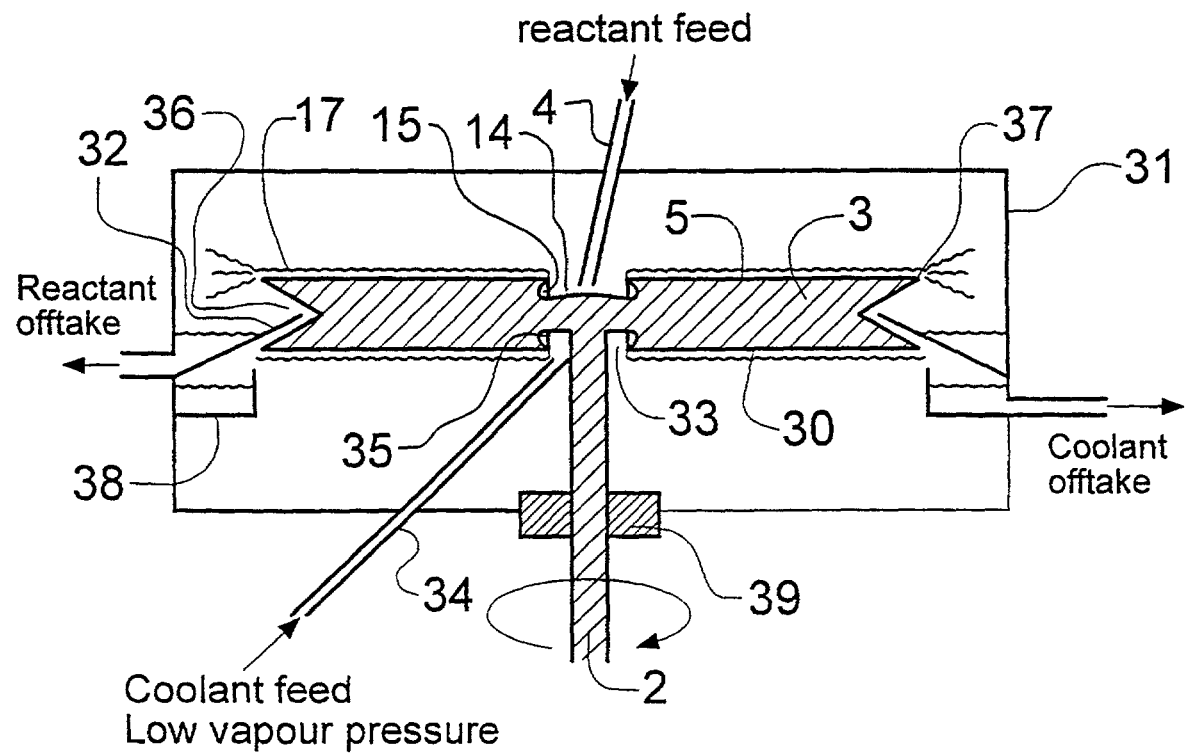
FIG. 3 shows a solid spinning disc with feed means for both a reactant and a heat transfer fluid.

FIG. 3 shows a solid rotatable disc (3) having a first surface (5) and a second, opposed surface (30), the disc (3) being mounted on a drive shaft (2) within a casing (31). A trough (14) is centrally located on the first surface (5) and is adapted to receive reactant (15) from feed means (4). As described hereinbelow, the reactant (15) spills out of the trough (14) upon rotation of the disc (3) so as to form a film (17) on the first surface (5). The reactant (15) migrates across the first surface (5) to a periphery region where it is thrown from the first surface (5) into a collector trough (32) which is provided about the periphery of the disc (3) within the casing (31). A second trough (33) is provided on the second surface (30) and feed means (34) is provided for supplying heat transfer fluid (35) to the second trough (33). Upon rotation of the disc (3), the heat transfer fluid (35) will spill onto the second surface (30) and migrate thereacross in a manner similar to the reactant (15) on the first surface (5). Because the disc (3) is made of metal and is therefore a good thermal conductor, heat transfer from or to the second surface (30) will effect heat transfer from or to the first surface (5). The disc (3) is shown with a groove (36) which extends about a circumferential wall (37) of the disc. The collector trough (32) extends into the groove (36) about the entire circumference of the disc (3) while still allowing the disc (3) to rotate freely, and thereby prevents reactant (15) or product thrown from the first surface (5) from mixing with heat transfer fluid (35) thrown from the second surface (30). A second collector trough (38) serves to collect heat transfer fluid (35) for recycling. A gasket or seal (39) is provided where the drive shaft (2) enters the casing (31) so as to prevent leakage of heat transfer fluid (35). The heat transfer fluid (35) may be supplied as a liquid at a relatively low vapour pressure, or a relatively low vapour pressure may be maintained within the reactor, so as to promote evaporation and thereby to absorb additional heat during the phase change from liquid to gas.

Figure 4:
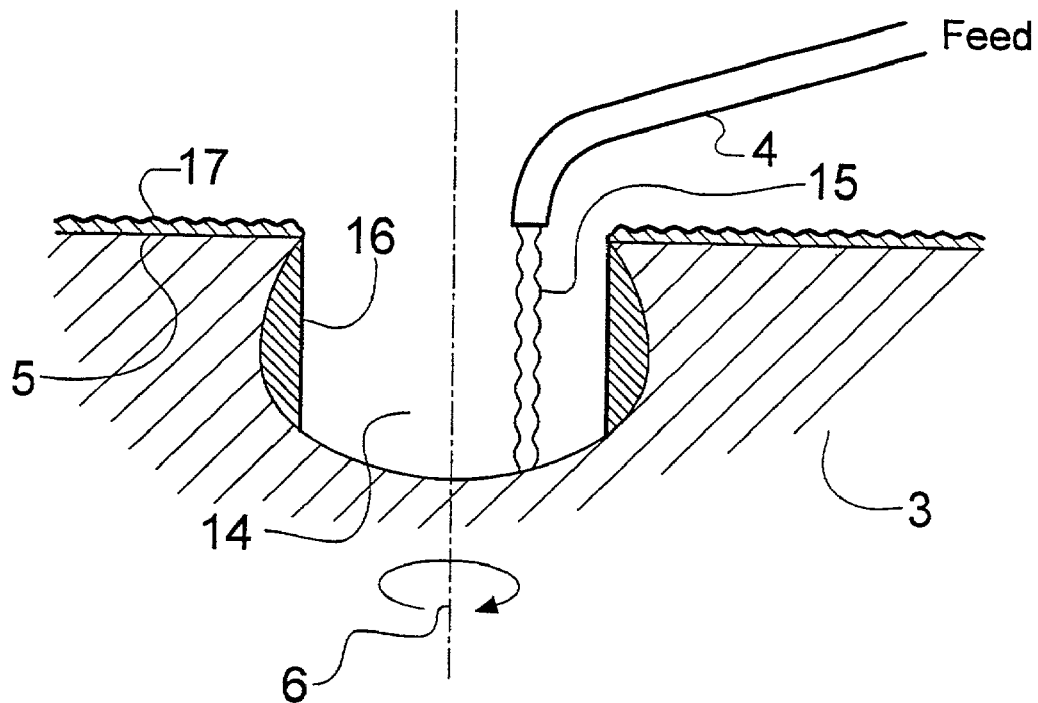
FIG. 4 shows a detail of a spinning disc having a central trough.

In FIG. 4 there is shown an axially located central trough (14) which is continuous and forms a well situated on the axis of rotation (6) of the rotating surface (5) of a disc (3). Rotation causes reactant or heat transfer fluid (15) supplied by the feed means (4) to flow to the wall and form an annular film (16) within the trough (14). The annular film (16) then spills over onto the surface (5) of the disc (3) to form a film (17) on the surface (5).

Figure 5:
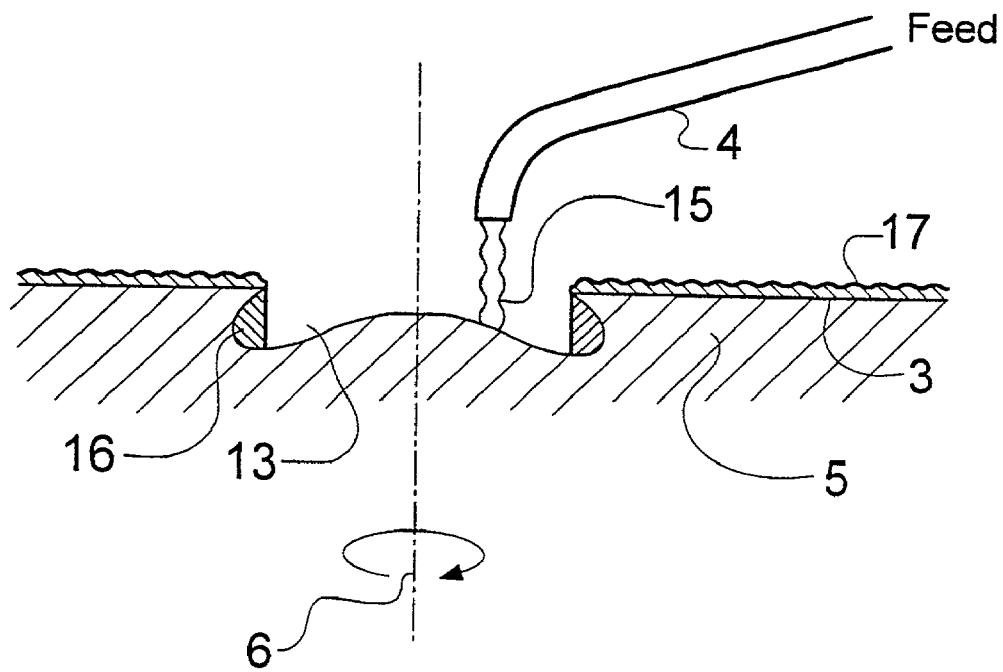
FIG. 5 shows a detail of a spinning disc having an annular trough.

In FIG. 5 the trough (13) is annular and forms a channel co-axial about the axis of rotation (6) of the disc (3). Rotation assisted by the trough profile causes reactant or heat transfer fluid (15) to flow into the trough (13) and to the wall thereof and form an annular film (16) within the trough (13) before spilling over onto the surface (5) of the disc (3) in the form of a film (17).

EXAMPLE 1

Polymerisation of Ethylene Using a Catalyst Coated Disc

Phillips catalyst was coated onto the surface of a spinning disc apparatus using methods as described hereinbefore. The coated disc was mounted in a spinning disc apparatus.

The spinning disc apparatus used is shown in diagrammatic form in FIG. 1. The main components of interest being:

i) Top Disc—A smooth brass disc of thickness 17 mm and diameter 500 mm capable of rotating around a vertical axis.

ii) Liquid Distributor—A circular copper pipe of diameter 100 mm, positioned concentrically over the disc, sprayed fluid vertically onto the disc surface from 50 uniformly spaced holes in the underside. Flowrate was controlled manually by a valve and monitored using a metric 18 size, stainless steel float rotameter. A typical fluid flow rate was 31.3 cc/s.

iii) Motor—A variable speed d.c. motor capable of rotating at 3000 rpm was used. The rotational speed was varied using a digital controller calibrated for disc speeds between 0 and 1000 rpm. A typical rotational speed was 50 rpm.

iv) Radiant Heaters—3 radiant heaters (each consisting of two elements) spaced equally below the disc provided heat to the disc. The temperature was varied using a temperature controller for each heater. Each heater temperature could be controlled up to 400° C. Triac regulators were used to control the speed of the controller response. (These remained on setting 10 throughout the tests).

v) Thermocouples and Datascanner—16 K-type thermocouples embedded in the top disc gave an indication of the surface temperature profile along the disc radius. Odd numbered thermocouples 1 to 15 inclusive were embedded from underneath the disc to a distance 3 mm from the upper disc surface. Even numbered thermocouples, 2 to 16 inclusive were embedded from underneath the disc to a distance 10 mm from the upper disc surface. Each pair of thermocouple, i.e. 1 & 2 and 3 & 4 and 5 & 6 etc., were embedded adjacently at radial distances of 85 mm, 95 mm, 110 mm, 128 mm, 150 mm, 175 mm, 205 mm and 245 mm respectively (see FIG. 3). The thermocouples were connected to the datascanner which transmitted and logged the data to the PC at set intervals using the DALITE Configuration and Monitoring Software Package.

vi) Manual Thermocouple—A hand-held K-type thermocouple was used to measure the bulk fluid temperature on top of the disc.

The rig was used in two arrangements. In one arrangement, feed was constantly added and the heated product was sent to the collection trough. In an alternative arrangement the rig was assembled with a recycle.

The spinning disc apparatus of FIG. 1 was started up and temperature and rotational speed adjusted. When steady stage was achieved gaseous ethylene was fed to the revolving catalyst coated disc surface at it axis. Product was withdrawn in the collection trough at the periphery of the disc. Analysis revealed the product was high grade polyethylene.

Figure 6:
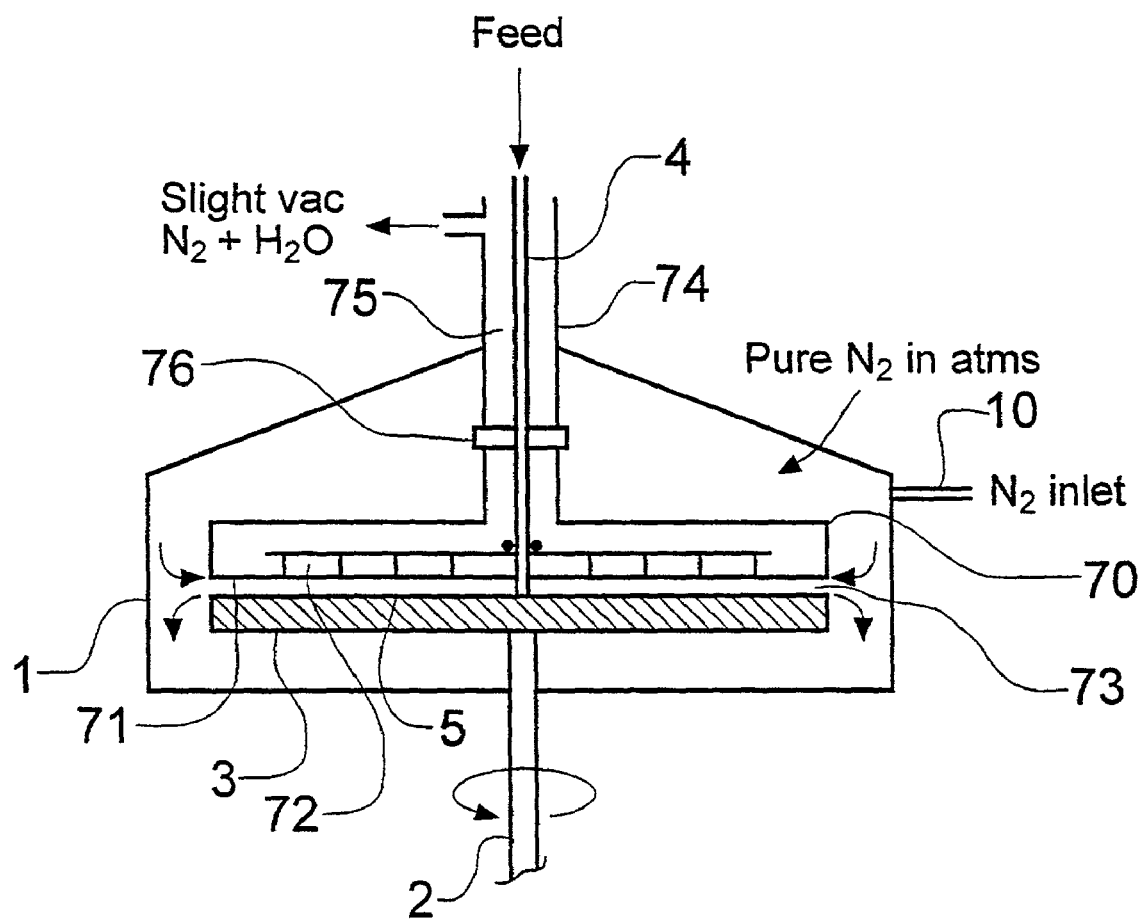
FIG. 6 shows a spinning disc provided with a rotary impeller.

FIG. 6 shows a spinning disc (3) with a surface (5) mounted on a drive shaft (2) inside a vessel (1) and provided with a feed (4) for a liquid phase reactant, such as an organic prepolymer. A rotary impeller (70) is mounted coaxially with the disc (3) and close to the surface (5), and a surface (71) of the impeller (70) facing the surface (5) is provided with vanes (72). A gaseous phase reactant, such as nitrogen, is supplied to the vessel (1) through an inlet (10). Upon rotation of the disc (3), the liquid phase reactant moves from the centre of the surface (5) towards the periphery thereof as described above. When the impeller (70) is appropriately rotated on a drive shaft (74), the gaseous phase reactant is sucked into the space (73) between the impeller (70) and the surface (5) and moves towards the centre of the surface (5) against the flow of liquid phase reactant, thereby improving mass and/or heat transfer characteristics. Gaseous phase reactant and unwanted reaction by-products may be removed from the central region of the space (73) by way of a discharge pipe (75) to which at least a partial vacuum may be applied. A partial seal (76) in the discharge pipe (75) may be provided so as to control the rate of gaseous phase reactant and by-product removal.

Further advantages of the invention are apparent from the foregoing.

What is claimed is:

1. A reactor apparatus including a hollow support element adapted to be rotatable about an axis, the support element having a first, external reaction surface and a second, internal heat transfer surface and means for applying a heat transfer fluid to the second surface, the first and second surfaces being in thermal communication with each other and the support element including an internal space bounded on one side by the second surface, wherein a plate or membrane is provided inside the hollow support element, the plate or membrane extending substantially over the whole internal space so as to define a first space between the second surface and one side of the plate or membrane and a second space between an opposed side of the plate or membrane and an internal surface of the support element remote from the second surface, but leaving a gap at a periphery of the plate or membrane so as to allow a heat transfer fluid to flow between the first and second spaces, wherein the opposed side of the plate or membrane is provided with vanes, fins or other projections or with a mesh or gauze or foam, these being configured so as to help prevent formation of free vortices in the heat transfer fluid, and further comprising a feed means for supplying at least one reactant in a fluid phase to the external reaction surface.

2. A reactor as claimed in claim 1, wherein the means for applying a heat transfer fluid comprises a fluid feed to an axial portion of the first space.

3. A reactor as claimed in claim 2, wherein the means for applying a heat transfer fluid comprises a feed tube passing along a hollow drive shaft connected to an axial portion of the support element, the feed tube being adapted to supply heat transfer fluid to the first space.

4. A reactor as claimed in claim 3, wherein a heat transfer fluid flow path is defined by the feed tube, the first space, the peripheral gap, the second space and a space provided between an external surface of the feed tube and an internal surface of the hollow drive shaft.

5. A reactor as claimed in claim 1, wherein the vanes, fins or other projections are radially oriented with respect to the axis of rotation.

6. A reactor as claimed claim 1, wherein the second surface is provided with a thermally conductive mesh, grid, corrugations or other projections which serve to increase a heat transfer area of the second surface.

7. The reactor apparatus of claim 1, wherein the external reaction surface has a center and the feed means supplies the at least one reactant in a fluid phase to the center.

8. A reactor apparatus including a support element adapted to be rotatable about an axis, the support element having generally opposed first and second surfaces, feed means for supplying at least one reactant to the first surface of the support element, collector means for collecting product from the first surface of the support element and means for applying a heat transfer fluid to the second surface, characterised in that the support element has a generally circular outer perimeter provided with a groove or indent thereabout and a circumferential baffle is fitted about the perimeter of the support element so as to project into the groove or indent while still allowing the support element to rotate freely, the circumferential baffle serving to keep separate reactant and heat transfer fluid which are thrown respectively from the first and second surfaces during operation of the reactor.

9. A reactor apparatus including a support element adapted to be rotatable about an axis, the support element having generally opposed first and second surfaces, feed means for supplying at least one reactant to the first surface of the support element, collector means for collecting product from the first surface of the support element and means for applying a heat transfer fluid to the second surface, characterised in that the second surface includes an axially located undercut trough into which the heat transfer fluid is supplied during operation of the reactor.

10. A reactor apparatus including a hollow support element adapted to be rotatable about an axis, the support element having a first, external reaction surface and a second, internal heat transfer surface and means for applying a heat transfer fluid to the second surface, the first and second surfaces being in thermal communication with each other and the support element including an internal space bounded on one side by the second surface, wherein a plate or membrane is provided inside the hollow support element, the plate or membrane extending substantially over the whole internal space so as to define a first space between the second surface and one side of the plate or membrane and a second space between an opposed side of the plate or membrane and an internal surface of the support element remote from the second surface, but leaving a gap at a periphery of the plate or membrane so as to allow a heat transfer fluid to flow between the first and second spaces, wherein there is further provided a rotary impeller or fan mounted close to the first surface and operable to generate a gaseous flow from a periphery of the surface towards a central region thereof, this flow being counter-current to a flow of reactant on the first surface.

11. A reactor apparatus including a support element adapted to be rotatable about an axis, the support element having generally opposed first and second surfaces, feed means for supplying at least one reactant to the first surface of the support element, collector means for collecting product from the first surface of the support element and means for applying a heat transfer fluid to the second surface, characterised in that the support element has a generally circular outer perimeter provided with a groove or indent thereabout and a circumferential baffle is fitted about the perimeter of the support element so as to project into the groove or indent while still allowing the support element to rotate freely, the circumferential baffle serving to keep separate reactant and hat transfer fluid which are thrown respectively from the first and second surfaces during operation of the reactor, wherein there is further provided a rotary impeller or fan mounted close to the first surface and operable to generate a gaseous flow from a periphery of the surface towards a central region thereof, this flow being counter-current to a flow of reactant on the first surface.

12. A reactor apparatus including a support element adapted to be rotatable about an axis, the support element having generally opposed first and second surfaces, feed means for supplying at least one reactant to the first surface of the support element, collector means for collecting product from the first surface of the support element and means for applying a heat transfer fluid to the second surface, characterised in that the second surface includes an axially located undercut trough into which the heat transfer fluid is supplied during operation of the reactor, wherein there is further provided a rotary impeller or fan mounted close to the first surface and operable to generate a gaseous flow from a periphery of the surface towards a central region thereof, this flow being counter-current to a flow of reactant on the first surface.

* * * * *